United States Patent
Huang et al.

(10) Patent No.: US 9,703,416 B2
(45) Date of Patent: Jul. 11, 2017

(54) TOUCH CIRCUIT, TOUCH PANEL AND DISPLAY APPARATUS

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventors: Fei Huang, Beijing (CN); Yun Qiao, Beijing (CN); Jun Fan, Beijing (CN); Fuqiang Li, Beijing (CN); Jian Sun, Beijing (CN); Cheng Li, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

( * ) Notice: Subject to any disclaimer, the term of this patent is extended or adjusted under 35 U.S.C. 154(b) by 0 days.

(21) Appl. No.: 14/902,422

(22) PCT Filed: May 21, 2015

(86) PCT No.: PCT/CN2015/079501
§ 371 (c)(1),
(2) Date: Dec. 31, 2015

(87) PCT Pub. No.: WO2016/115797
PCT Pub. Date: Jul. 28, 2016

(65) Prior Publication Data
US 2016/0370918 A1    Dec. 22, 2016

(30) Foreign Application Priority Data
Jan. 21, 2015    (CN) .......................... 2015 1 0030501

(51) Int. Cl.
G06F 3/041        (2006.01)
G06F 3/044        (2006.01)
G06F 1/32         (2006.01)

(52) U.S. Cl.
CPC ............ G06F 3/0416 (2013.01); G06F 3/044 (2013.01); G06F 3/0412 (2013.01); G06F 1/3262 (2013.01)

(58) Field of Classification Search
CPC ....... G09G 5/00; G06F 1/3262; G06F 3/0412; G06F 3/0416; G06F 3/044
See application file for complete search history.

(56) References Cited

U.S. PATENT DOCUMENTS 8,237,692 B2 * 8/2012 Tsai .......................... G09G 3/20
345/100
9,513,732 B2 * 12/2016 Zhao ....................... G06F 3/044
(Continued)

FOREIGN PATENT DOCUMENTS

CN        103218972         7/2013
CN        103514847 A       1/2014
(Continued)

OTHER PUBLICATIONS

International Search Report & Written Opinion Appln. No. PCT/CN2015/079501; Dated Sep. 25, 2015.
(Continued)

*Primary Examiner* — Afroza Chowdhury
(74) *Attorney, Agent, or Firm* — Ladas & Parry LLP (57) ABSTRACT

There is provided a touch circuit, a touch panel and a display apparatus. In the touch circuit, an input module (01) is used for pulling up the potential of a first node (P1), a reset module (02) is used for pulling down the potential of the first node (P1), a pull-up module (03) is used for pulling up the potential of a control signal output terminal (OUT), a
(Continued)

pull-down module (04) is used for pulling down potentials of the first node (P1) and the control signal output terminal (OUT), a touch signal output control module (05) is used for controlling a touch signal output terminal (TX) to choose to output a high-frequency signal (TH) or a common voltage signal (VCOM) so as to achieve the function of outputting a touch signal by the touch circuit.

20 Claims, 8 Drawing Sheets

(56) References Cited

U.S. PATENT DOCUMENTS

| | | | |
|---|---|---|---|
| 2009/0167741 A1 | 7/2009 | Tsai | |
| 2012/0294095 A1* | 11/2012 | Shiu | G11C 7/1057 365/189.11 |
| 2013/0335367 A1* | 12/2013 | Kim | G09G 3/3696 345/174 |

FOREIGN PATENT DOCUMENTS

| | | |
|---|---|---|
| CN | 103761002 A | 4/2014 |
| CN | 103943055 A | 7/2014 |
| CN | 103943083 A | 7/2014 |
| CN | 203746393 U | 7/2014 |
| CN | 103996370 A | 8/2014 |
| CN | 104036738 A | 9/2014 |
| CN | 104217763 A | 12/2014 |
| CN | 204102544 U | 1/2015 |
| CN | 104571710 A | 4/2015 |
| JP | 2008-193545 A | 8/2008 |
| TW | 200929131 A | 7/2009 |

OTHER PUBLICATIONS

First Chinese Office Action dated Mar. 3, 2017; Appln. No. 201510030501.9.

* cited by examiner

TOUCH CIRCUIT, TOUCH PANEL AND DISPLAY APPARATUS

TECHNICAL FIELD

The present disclosure relates to the field of display technology, and particularly to a touch circuit, a touch panel and a display apparatus.

BACKGROUND

Presently, with the continuous development of mobile display devices, the way of man-machine interaction has been developed into a touch sensation mode from the original mechanical button mode. Therefore, a touch circuit in a display device plays a vital role.

Figure 1:
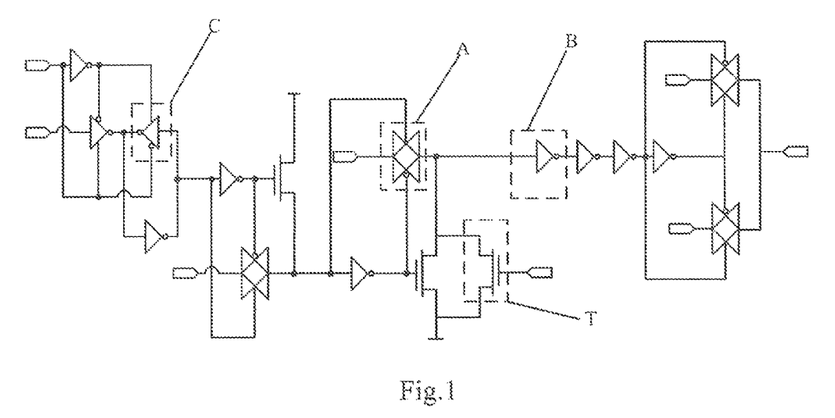
FIG. 1 is a schematic diagram of the structure of a known touch circuit.

A known touch panel employs a touch circuit as illustrated in FIG. 1 to implement a touch scan function. The circuit structure of the touch circuit includes multiple gate circuits such as transmission gates A, NOT gates B, tri-state gates C and the like, as well as a switching transistor T. Both the circuit of the transmission gate A and the circuit of the NOT gate B require a combination of two thin film transistors to implement their respective functions, when the circuit of the tri-state C requires four thin film transistors to implement its function. As a result, the implementation of the entire touch circuit needs at least 32 thin film transistors, the structure thereof is complicated and the amount of thin film transistors needed is large, and thus the power consumption thereof is large.

Thus, it is a problem urgently needed to be solved by those skilled in the art how to simplify the structure of a touch circuit and to lower the power consumption of the touch circuit.

SUMMARY OF THE DISCLOSURE

An embodiment of the present disclosure provides a touch circuit, a touch panel and a display apparatus, which may solve the problem that the structure of the know touch circuit is complicated and the power consumption thereof is large.

An embodiment of the present disclosure provides a touch panel comprising an input module, a reset module, a pull-up module, a pull-down module and a touch signal output control module, wherein:

a control terminal of the input module is connected with a signal input terminal, an input terminal thereof is connected with a high-level signal terminal, and an output terminal thereof is connected with a first node, the input module being used for pulling up the potential of the first node under the control of the signal input terminal;

a control terminal of the reset module is connected with a reset signal terminal, an input terminal thereof is connected with the first node, and an output terminal thereof is connected with a low-level signal terminal, the reset module being used for pulling down the potential of the first node under the control of the reset signal terminal;

a control terminal of the pull-up module is connected with the first node, an input terminal thereof is connected with a first clock signal terminal, and an output terminal thereof is connected with a control signal output terminal, the pull-up module being used for pulling up the potential of the control signal output terminal under the control of the first node and the first clock signal terminal;

the pull-down module is connected among the high-level signal terminal, the low-level signal terminal, a second clock signal terminal, a third clock signal terminal, the control signal output terminal and the first node, the pull-down module being used for pulling down potentials of the first node and the control signal output terminal under the control of the second clock signal terminal and the third clock signal terminal;

the touch signal output control module is connected among the high-level signal terminal, the low-level signal terminal, the control signal output terminal, a low-frequency signal terminal, a high-frequency signal terminal, a common voltage signal terminal, an cut-off signal terminal and a touch signal output terminal, the touch signal output control module being used for controlling the touch signal output terminal to choose to output a high-frequency signal or a common voltage signal under the control of the control signal output terminal.

Optionally, in the above touch circuit provided by the embodiment of the present disclosure, the pull-down module comprises a first pull-down unit, a second pull-down unit, a first pull-down control unit and a second pull-down control unit;

the first pull-down control unit is connected among the second clock signal terminal, the third clock signal terminal, the high-level signal terminal, the low-level signal terminal, the first node and a second node, the first pull-down control unit being used for pulling up the potential of the second node under the control of the second clock signal terminal and the third clock signal terminal;

a control terminal of the second pull-down control unit is connected with the first node, an input terminal thereof is connected with the second node, and an output thereof is connected with the low-level signal terminal, the second pull-down control unit being used for pulling down the potential of the second node when the potential of the first node is being pulled up;

a control terminal of the first pull-down unit is connected with the second node, an input terminal thereof is connected with the control signal output terminal, and an output thereof is connected with the low-level signal terminal, the first pull-down unit being used for pulling down the potential of the control signal output terminal when the potential of the second node is being pulled up;

a control terminal of the second pull-down unit is connected with the second node, an input terminal thereof is connected with the first node, and an output thereof is connected with the low-level signal terminal, the second pull-down unit being used for pulling down the potential of the first node when the potential of the second node is being pulled up.

Optionally, in the above touch circuit provided by the embodiment of the present disclosure, the first pull-down unit comprises a first switching transistor and a first capacitor;

a gate of the first switching transistor is connected with the second node, a source thereof is connected with the control signal output terminal, and a drain thereof is connected with the low-level signal terminal;

the first capacitor is connected between the second node and the low-level signal terminal.

Optionally, in the above touch circuit provided by the embodiment of the present disclosure, the second pull-down unit comprises a second switching transistor;

a gate of the second switching transistor is connected with the second node, a source thereof is connected with the first node, and a drain thereof is connected with the low-level signal terminal.

Optionally, in the above touch circuit provided by the embodiment of the present disclosure, the first pull-down control unit comprises a third switching transistor, a fourth switching transistor and a fifth switching transistor;

a gate of the third switching transistor is connected with the second clock signal terminal, a source thereof is connected with the high-level signal terminal, and a drain thereof is connected with a source of the fourth switching transistor and a gate of the fifth switching transistor respectively;

a gate of the fourth switching transistor is connected with the third clock signal terminal, and a drain thereof is connected with the low-level signal terminal;

a source of the fifth switching transistor is connected with the high-level signal terminal, and a drain thereof is connected with the second node.

Optionally, in the above touch circuit provided by the embodiment of the present disclosure, the second pull-down control unit comprises a sixth switching transistor;

a gate of the sixth switching transistor is connected with the first node, a source thereof is connected with the second node, and a drain thereof is connected with the low-level signal terminal.

Optionally, in the above touch circuit provided by the embodiment of the present disclosure, the touch signal output control module comprises a high-frequency signal output control unit, a common voltage signal output control unit, a third node pull-up unit and a third node pull-down unit;

a control terminal of the third node pull-up unit is connected with the control signal output terminal, an input terminal thereof is connected with the low-frequency signal terminal, and an output thereof is connected with the third node, the third node pull-up unit being used for pulling up the potential of the third node when the potential of the control signal output terminal is being pulled up;

a control terminal of the third node pull-down unit is connected with the cut-off signal terminal, an input terminal thereof is connected with the third node, and an output thereof is connected with the low-level signal terminal, the third node pull-down unit being used for pulling down the potential of the third node under the control of the cut-off signal terminal;

a control terminal of the high-frequency signal output control unit is connected with the third node, an input terminal thereof is connected with the high-frequency signal terminal, and an output thereof is connected with the touch signal output terminal, the high-frequency signal output control unit being used for controlling the touch signal output terminal to output the high-frequency signal when the potential of the third node is being pulled up;

the common voltage signal output control unit is connected among the third node the low-level signal terminal, the high-level signal terminal, the common voltage signal terminal and the touch signal output terminal, the common voltage signal output control unit being used for controlling the touch signal output terminal to output the common voltage signal when the potential of the third node is being pulled down.

Optionally, in the above touch circuit provided by the embodiment of the present disclosure, the third node pull-up unit comprises a seventh switching transistor;

a gate of the seventh switching transistor is connected with the control signal output terminal, a source thereof is connected with the low-frequency signal terminal, and a drain thereof is connected with the third node.

Optionally, in the above touch circuit provided by the embodiment of the present disclosure, the third node pull-down unit comprises an eighth switching transistor;

a gate of the eighth switching transistor is connected with the cut-off signal terminal, a source thereof is connected with the third node, and a drain thereof is connected with the low-level signal terminal.

Optionally, in the above touch circuit provided by the embodiment of the present disclosure, the high-frequency signal output control unit comprises a ninth switching transistor and a second capacitor;

a gate of the ninth switching transistor is connected with the third node, a source thereof is connected with the high-frequency signal terminal, and a drain thereof is connected with the touch signal output terminal;

the second capacitor is connected between the third node and the touch signal output terminal.

Optionally, in the above touch circuit provided by the embodiment of the present disclosure, the common voltage signal output control unit comprises a tenth switching transistor, an eleventh switching transistor and a third capacitor;

a gate of the tenth switching transistor is connected with the third node, a source thereof is connected with the high-level signal terminal and the a gate of the eleventh switching transistor respectively, and a drain thereof is connected with the low-level signal terminal;

a source of the eleventh switching transistor is connected with the common voltage signal terminal, and a drain thereof is connected with the touch signal output terminal;

the third capacitor is connected between the high-level signal terminal and the low-level signal terminal.

Optionally, in the above touch circuit provided by the embodiment of the present disclosure, the common voltage signal output control unit comprises a twelfth switching transistor;

a gate and a source of the twelfth switching transistor are connected with the high-level signal terminal, and a drain thereof is connected with the source of the tenth switching transistor and the gate of the eleventh switching transistor.

Optionally, in the above touch circuit provided by the embodiment of the present disclosure, the input module comprises a thirteenth switching transistor;

a gate of the thirteenth switching transistor is connected with the signal input terminal, a source thereof is connected with the high-level signal terminal, and a drain thereof is connected with the first node.

Optionally, in the above touch circuit provided by the embodiment of the present disclosure, the reset module comprises a fourteenth switching transistor;

a gate of the fourteenth switching transistor is connected with the reset signal terminal, a source thereof is connected with the first node, and a drain thereof is connected with the low-level signal terminal.

Optionally, in the above touch circuit provided by the embodiment of the present disclosure, the pull-up module comprises a fifteenth switching transistor and a fourth capacitor;

a gate of the fifteenth switching transistor is connected with the first node, a source thereof is connected with the first clock signal terminal, and a drain thereof is connected with the control signal output terminal;

the fourth capacitor is connected between the first node and the control signal output terminal.

An embodiment of the present disclosure provides a touch panel comprising a plurality of cascaded touch circuits provided by the embodiment of the present disclosure above, the control signal output terminal of each of touch circuits other than the first-stage touch circuit and the last-stage touch circuit being connected with the signal input terminal of the next-stage touch circuit adjacent thereto and with the reset signal terminal of the previous-stage touch circuit adjacent thereto, the control signal output terminal of the first-stage touch circuit being connected with the signal input terminal of the second-stage touch circuit, and the control signal output terminal of the last-stage touch circuit being connected with the reset signal terminal of the previous-stage touch circuit.

An embodiment of the present disclosure provides a display apparatus comprising the above touch panel provided by the embodiment of the present disclosure.

Embodiments of the present disclosure provide a touch circuit, a touch panel and a display apparatus. The touch circuit includes an input module, a reset module, a pull-up module, a pull-down module and a touch signal output control module. The input module is used for pulling up the potential of the first node under the control of the signal input terminal. The reset module is used for pulling down the potential of the first node under the control of the reset signal terminal. The pull-up module is used for pulling up the potential of the control signal output terminal under the control of the first node and the first clock signal terminal. The pull-down module is used for pulling down potentials of the first node and the control signal output terminal under the control of the second clock signal terminal and the third clock signal terminal. The touch signal output control module is used for controlling the touch signal output terminal to choose to output a high-frequency signal or a common voltage signal under the control of the control signal output terminal. In this way, the function of outputting a touch signal by a touch circuit is implemented. As compared with the known touch circuit in which more thin film transistors are used to build circuits of transmission gates, inverters and tri-state gates, the touch circuit provided by the embodiment of the present disclosure has a simpler structure and the lower power consumption.

DETAILED DESCRIPTION

In the following, the specific implementation of a touch circuit, a touch panel and a display apparatus provided by embodiments of the present disclosure will be described in detail in conjunction with attached drawings.

Figure 2:
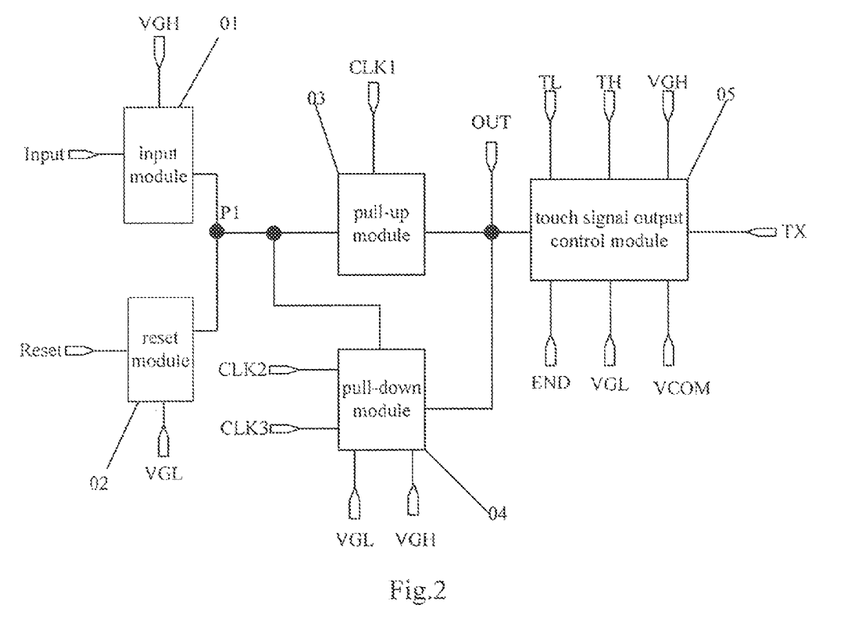
FIG. 2 is one of schematic diagrams of a structure of a touch circuit provided by an embodiment of the present disclosure.

An embodiment of the present disclosure provides a touch circuit, as illustrated in FIG. 2, which may includes an input module 01, a reset module 02, a pull-up module 03, a pull-down module 04, and a touch signal output control module 05.

A control terminal of the input module 01 is connected with a signal input terminal INPUT, an input terminal thereof is connected with a high-level signal terminal VGH, and an output terminal thereof is connected with a first node P1. The input module 01 is used for pulling up the potential of the first node P1 under the control of the signal input terminal INPUT.

A control terminal of the reset module 02 is connected with a reset signal terminal RESET, an input terminal thereof is connected with the first node P1, and an output terminal thereof is connected with a low-level signal terminal VGL. The reset module 02 is used for pulling down the potential of the first node P1 under the control of the reset signal terminal RESET.

A control terminal of the pull-up module 03 is connected with the first node P1, an input terminal thereof is connected with a first clock signal terminal CLK1, and an output terminal thereof is connected with a control signal output terminal OUT. The pull-up module 03 is used for pulling up the potential of the control signal output terminal OUT under the control of the first node P1 and the first clock signal terminal CLK1.

The pull-down module 04 is connected among the high-level signal terminal VGH, the low-level signal terminal VGL, a second clock signal terminal CLK2, a third clock signal terminal CLK3, the control signal output terminal OUT and the first node P1. The pull-down module 04 is used for pulling down potentials of the first node P1 and the control signal output terminal OUT under the control of the second clock signal terminal CLK2 and the third clock signal terminal CLK3.

The touch signal output control module 05 is connected among the high-level signal terminal VGH, the low-level signal terminal VGL, the control signal output terminal OUT, a low-frequency signal terminal TL, a high-frequency signal terminal HL, a common voltage signal terminal VCOM, a cut-off signal terminal END and a touch signal output terminal TX. The touch signal output control module 05 is used for controlling the touch signal output terminal TX to choose to output a high-frequency signal or a common voltage signal under the control of the control signal output terminal OUT.

In the above touch circuit provided by the embodiment of the present disclosure, there are included the input module 01, the reset module 02, the pull-up module 03, the pull-down module 04, and the touch signal output control module 05. The input module 01 is used for pulling up the potential of the first node P1 under the control of the signal input terminal INPUT. The reset module 02 is used for pulling down the potential of the first node P1 under the control of the reset signal terminal RESET. The pull-up module 03 is used for pulling up the potential of the control signal output terminal OUT under the control of the first node P1 and the first clock signal terminal CLK1. The pull-down module 04 is used for pulling down potentials of the first node P1 and the control signal output terminal OUT under the control of the second clock signal terminal CLK2 and the third clock signal terminal CLK3. The touch signal output control module 05 is used for controlling the touch signal output terminal TX to choose to output a high-frequency signal or a common voltage signal under the control of the control signal output terminal OUT. In this way, the function of outputting a touch signal by a touch circuit is implemented. As compared with the prior art in which more thin film transistors are used to build circuits of transmission gates, inverters and tri-state gates so as to configure the touch circuit, the touch circuit provided by the embodiment of the present disclosure has a simpler structure and the lower power consumption.

Figure 3:
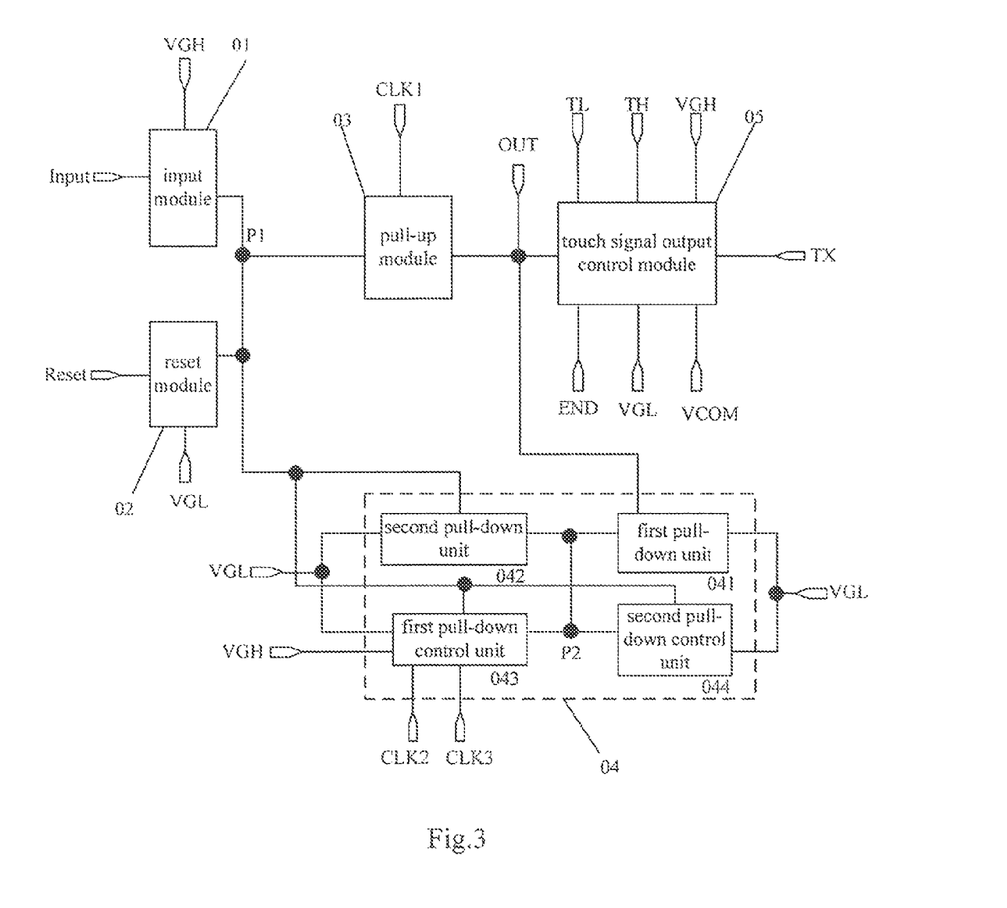
FIG. 3 is a schematic diagram of a structure of a pull-down module in a touch circuit provided by an embodiment of the present disclosure.

In the specific implementation, in the above touch circuit provided by the embodiment of the present disclosure, as illustrated in FIG. 3, the pull-down module 04 may specifically includes a first pull-down unit 041, a second pull-down unit 042, a first pull-down control unit 043 and a second pull-down control unit 044.

The first pull-down control unit 043 is connected among the second clock signal terminal CLK2, the third clock signal terminal CLK3, the high-level signal terminal VGH, the low-level signal terminal VGL, the first node P1 and a second node P2. The first pull-down control unit 043 is used for pulling up the potential of the second node P2 under the control of the second clock signal terminal CLK2 and the third clock signal terminal CLK3.

A control terminal of the second pull-down control unit 044 is connected with the first node P1, an input terminal thereof is connected with the second node P2, and an output thereof is connected with the low-level signal terminal VGL. The second pull-down control unit 044 is used for pulling down the potential of the second node P2 when the potential of the first node P1 is being pulled up.

A control terminal of the first pull-down unit 041 is connected with the second node P2, an input terminal thereof is connected with the control signal output terminal OUT, and an output thereof is connected with the low-level signal terminal VGL. The first pull-down unit 041 is used for pulling down the potential of the control signal output terminal OUT when the potential of the second node P2 is being pulled up.

A control terminal of the second pull-down unit 042 is connected with the second node P2, an input terminal thereof is connected with the first node P1, and an output thereof is connected with the low-level signal terminal VGL. The second pull-down unit 042 is used for pulling down the potential of the first node P1 when the potential of the second node P2 is being pulled up.

Specifically, in the above touch circuit provided by the embodiment of the present disclosure, the first pull-down control unit 043 pulls up the potential of the second node P2 under the control of the second clock signal terminal CLK2 and the third clock signal terminal CLK3. The first pull-down unit 041 pulls down the potential of the control signal output terminal OUT when the potential of the second node P2 is being pulled up. The second pull-down unit 042 pulls down the potential of the first node P1 when the potential of the second node P2 is being pulled up. Thereby, the pull-down module 04 realizes the function of pulling down potentials of the first node P1 and the control signal output terminal OUT under the control of the second clock signal terminal CLK2 and the third clock signal terminal CLK3.

Figure 4:
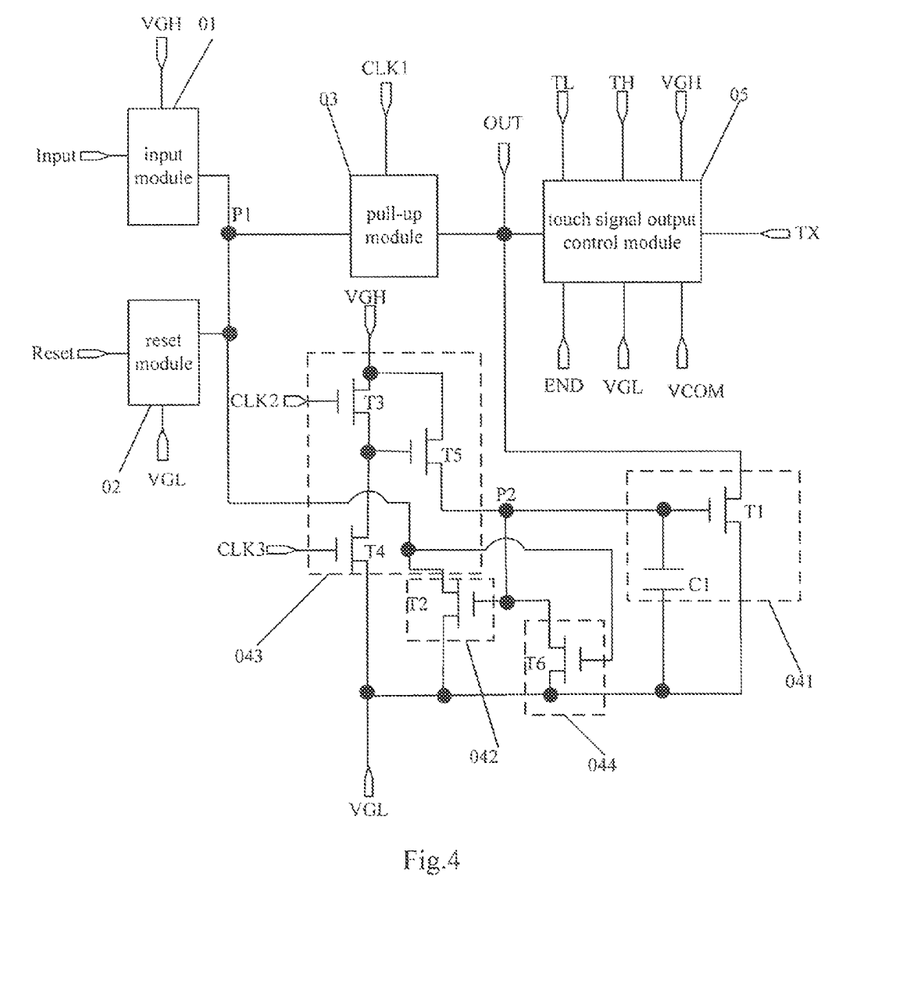
FIG. 4 is a schematic diagram of a detailed structure of a pull-down module in a touch circuit provided by an embodiment of the present disclosure.

In the specific implementation, in the above touch circuit provided by the embodiment of the present disclosure, as illustrated in FIG. 4, the first pull-down unit 041 may specifically include a first switching transistor T1 and a first capacitor C1.

A gate of the first switching transistor T1 is connected with the second node P2, a source thereof is connected with the control signal output terminal OUT, and a drain thereof is connected with the low-level signal terminal VGL.

The first capacitor C1 is connected between the second node P2 and the low-level signal terminal VGL.

Specifically, in the above touch circuit provided by the embodiment of the present disclosure, when the potential of the second node P2 is pulled up, the first switching transistor T1 is in a turned-on state, and the turned-on first switching transistor T1 connects the low-level signal terminal VGL with the control signal output terminal OUT. In turn, the potential of the control signal output terminal OUT is pulled down.

In the specific implementation, in the above touch circuit provided by the embodiment of the present disclosure, as illustrated in FIG. 4, the second pull-down unit 042 may specifically include a second switching transistor T2.

A gate of the second switching transistor T2 is connected with the second node P2, a source thereof is connected with the first node P1, and a drain thereof is connected with the low-level signal terminal VGL.

Specifically, in the above touch circuit provided by the embodiment of the present disclosure, when the potential of the second node P2 is pulled up, the second switching transistor T2 is in a turned-on state, and the turned-on second switching transistor T2 connects the low-level signal terminal VGL with the first node P1. Then, the potential of the first node P1 is pulled down.

In the specific implementation, in the above touch circuit provided by the embodiment of the present disclosure, as illustrated in FIG. 4, the first pull-down control unit 043 may specifically include a third switching transistor T3, a fourth switching transistor T4 and a fifth switching transistor T5.

A gate of the third switching transistor T3 is connected with the second clock signal terminal CLK2, a source thereof is connected with the high-level signal terminal VGH, and a drain thereof is connected with a source of the fourth switching transistor T4 and a gate of the fifth switching transistor T5.

A gate of the fourth switching transistor T4 is connected with the third clock signal terminal CLK3, and a drain thereof is connected with the low-level signal terminal VGL.

A source of the fifth switching transistor T5 is connected with the high-level signal terminal VGH, and a drain thereof is connected with the second node P2.

Specifically, in the above touch circuit provided by the embodiment of the present disclosure, when a high-level signal is input to the second clock signal terminal CLK2 and a low-level signal is input to the third clock signal terminal CLK3, the third switching transistor T3 is in a turned-on state, and the fourth switching transistor T4 is in a turned-off state. The turned-on third switching transistor T3 connects the high-level signal terminal VGH with the gate of the fifth switching transistor T5 so as to control the fifth switching transistor T5 to be turned on. The turned-on fifth switching transistor T5 connects the high-level signal terminal VGH with the second node P2, thereby pulling up the potential of the second node P2.

In the specific implementation, in the above touch circuit provided by the embodiment of the present disclosure, as illustrated in FIG. 4, the second pull-down control unit 044 may specifically include a sixth switching transistor T6.

A gate of the sixth switching transistor T6 is connected with the first node P1, a source thereof is connected with the second node P2, and a drain thereof is connected with the low-level signal terminal VGL.

Specifically, in the above touch circuit provided by the embodiment of the present disclosure, when the potential of the first node P1 is pulled up, the sixth switching transistor T6 is in a turned-on state. The turned-on sixth switching transistor T6 connects the low-level signal terminal VGL with the second node P2, thereby pulling down the potential of the second node P2.

Figure 5:
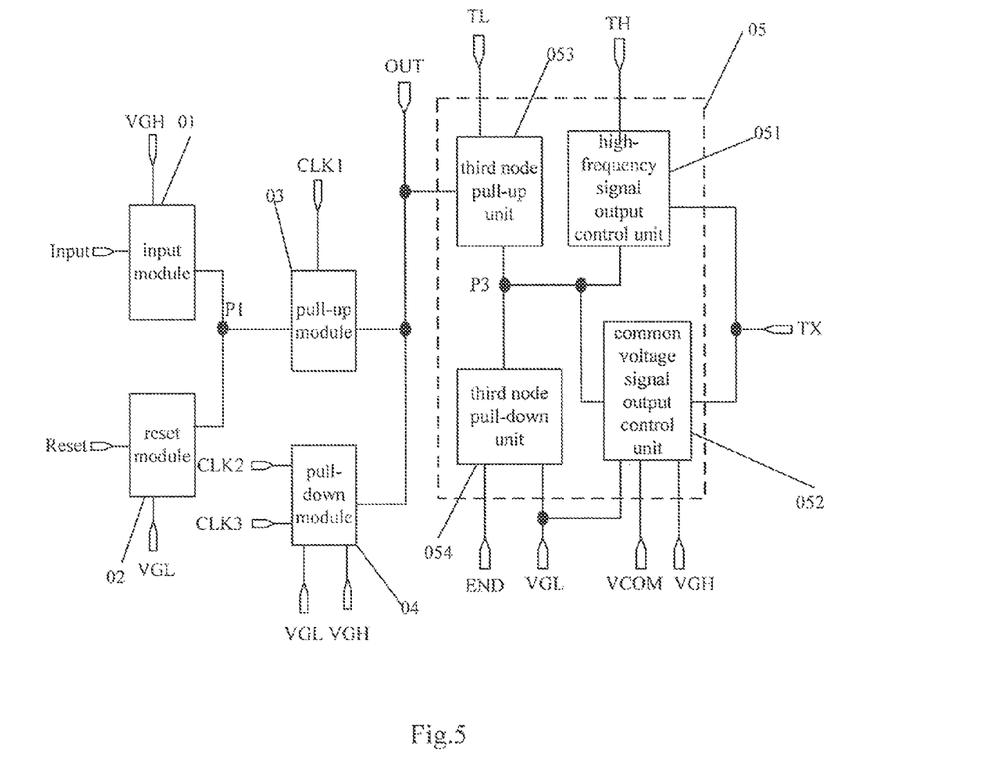
FIG. 5 is a schematic diagram of a structure of a touch signal output control module in a touch circuit provided by an embodiment of the present disclosure.

In the specific implementation, in the above touch circuit provided by the embodiment of the present disclosure, as illustrated in FIG. 5, the touch signal output control module 05 may specifically include a high-frequency signal output control unit 051, a common voltage signal output control unit 052, a third node pull-up unit 053 and a third node pull-down unit 054.

A control terminal of the third node pull-up unit 053 is connected with the control signal output terminal OUT, an input terminal thereof is connected with the low-frequency signal terminal TL, and an output thereof is connected with the third node P3. The third node pull-up unit 053 is used for pulling up the potential of the third node P3 when the potential of the control signal output terminal OUT is being pulled up.

A control terminal of the third node pull-down unit 054 is connected with the cut-off signal terminal END, an input terminal thereof is connected with the third node P3, and an output thereof is connected with the low-level signal terminal VGL. The third node pull-down unit 054 is used for pulling down the potential of the third node P3 under the control of the cut-off signal terminal END.

A control terminal of the high-frequency signal output control unit 051 is connected with the third node P3, an input terminal thereof is connected with the high-frequency signal terminal TH, and an output thereof is connected with the touch signal output terminal TX. The high-frequency signal output control unit 051 is used for controlling the touch signal output terminal TX to output the high-frequency signal when the potential of the third node P3 is being pulled up.

The common voltage signal output control unit 052 is connected among the third node P3, the low-level signal terminal VGL, the high-level signal terminal VGH, the common voltage signal terminal VCOM and the touch signal output terminal TX. The common voltage signal output control unit 052 is used for controlling the touch signal output terminal TX to output the common voltage signal when the potential of the third node P3 is being pulled down.

Specifically, in the above touch circuit provided by the embodiment of the present disclosure, the third node pull-up unit 053 pulls up the potential of the third node P3 when the potential of the control signal output terminal OUT is pulled up. The third node pull-down unit 054 pulls down the potential of the third node P3 when the high-level signal is input to the cut-off signal terminal END. The high-frequency signal output control unit 051 controls the touch signal output terminal TX to output the high-frequency signal when the potential of the third node P3 is pulled up. The common voltage signal output control unit 052 controls the touch signal output terminal TX to output the common voltage signal when the potential of the third node P3 is pulled down. Thereby, the touch signal output control module 05 achieves the function of choosing to output the high-frequency signal or the common voltage signal under the control the control signal output terminal OUT.

Figure 6:
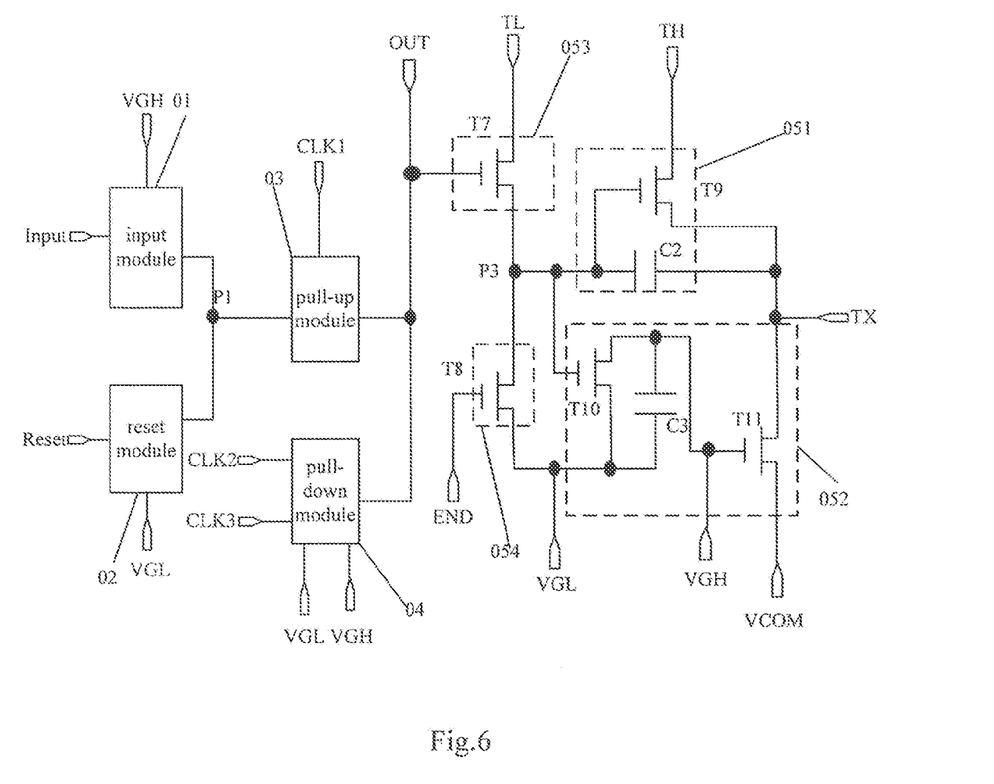
FIG. 6 is a schematic diagram of a detailed structure of a touch signal output control module in a touch circuit provided by an embodiment of the present disclosure.

In the specific implementation, in the above touch circuit provided by the embodiment of the present disclosure, as illustrated in FIG. 6, the third node pull-up unit 053 may specifically include a seventh switching transistor T7.

A gate of the seventh switching transistor T7 is connected with the control signal output terminal OUT, a source thereof is connected with the low-frequency signal terminal TL, and a drain thereof is connected with the third node P3.

Specifically, in the above touch circuit provided by the embodiment of the present disclosure, when the potential of the control signal output terminal OUT is pulled up, the seventh switching transistor T7 is in a turned-on state, and the turned-on seventh switching transistor T7 connects the low-frequency signal terminal TL with the third node P3. Then, the potential of the third node P3 is pulled up.

In the specific implementation, in the above touch circuit provided by the embodiment of the present disclosure, as illustrated in FIG. 6, the third node pull-down unit 054 may specifically include an eighth switching transistor T8.

A gate of the eighth switching transistor T8 is connected with the cut-off signal terminal END, a source thereof is connected with the third node P3, and a drain thereof is connected with the low-level signal terminal VGL.

Specifically, in the above touch circuit provided by the embodiment of the present disclosure, when the high-level signal is input to the cut-off signal terminal END, the eighth switching transistor T8 is in a turned-on state, and the turned-on eighth switching transistor T8 connects the low-level signal terminal VGL with the third node P3. Then, the potential of the third node P3 is pulled down.

In the specific implementation, in the above touch circuit provided by the embodiment of the present disclosure, as illustrated in FIG. 6, the high-frequency signal output control unit 051 may specifically include a ninth switching transistor T9 and a second capacitor C2.

A gate of the ninth switching transistor T9 is connected with the third node P3, a source thereof is connected with the high-frequency signal terminal TH, and a drain thereof is connected with the touch signal output terminal TX.

The second capacitor C2 is connected between the third node P3 and the touch signal output terminal TX.

Specifically, in the above touch circuit provided by the embodiment of the present disclosure, when the potential of the third node P3 is pulled up, the ninth switching transistor T9 is in a turned-on state, and the turned-on ninth switching transistor T9 connects the high-frequency signal terminal TH with the touch signal output terminal TX, so that the touch signal output terminal TX outputs the high-frequency signal.

In the specific implementation, in the above touch circuit provided by the embodiment of the present disclosure, as illustrated in FIG. 6, the common voltage signal output control unit 052 may specifically include a tenth switching transistor T10, an eleventh switching transistor T11 and a third capacitor C3.

A gate of the tenth switching transistor T10 is connected with the third node P3, a source thereof is connected with the high-level signal terminal VGH and a gate of the eleventh switching transistor T11, and a drain thereof is connected with the low-level signal terminal VGL.

A source of the eleventh switching transistor T11 is connected with the common voltage signal terminal VCOM, and a drain thereof is connected with the touch signal output terminal TX.

The third capacitor C3 is connected between the high-level signal terminal VGH and the low-level signal terminal VGL.

Specifically, in the above touch circuit provided by the embodiment of the present disclosure, when the potential of the third node P3 is pulled up, the tenth switching transistor T10 is in a turned-on state, and the turned-on tenth switching transistor T10 connects the gate of the eleventh switching transistor T11 with the low-level signal terminal VGL, so that the eleventh switching transistor T11 is turned off. In addition, the size of the tenth switching transistor T10 is large, which may increase its effect of voltage division, pull down the voltage at the gate of eleventh switching transistor T11 very well, and ensure that eleventh switching transistor T11 is completely turned off. When the potential of the third node P3 is pulled down, the tenth switching transistor T10 is in a turned-off state. Since the gate of the eleventh switching transistor T11 is connected with the high-level signal terminal VGH, the eleventh switching transistor T11 is in a turned-on state. The turned-on eleventh switching transistor T11 connects the common voltage signal terminal VCOM with the touch signal output terminal TX, so that the touch signal output terminal TX outputs the common voltage signal.

Figure 7:
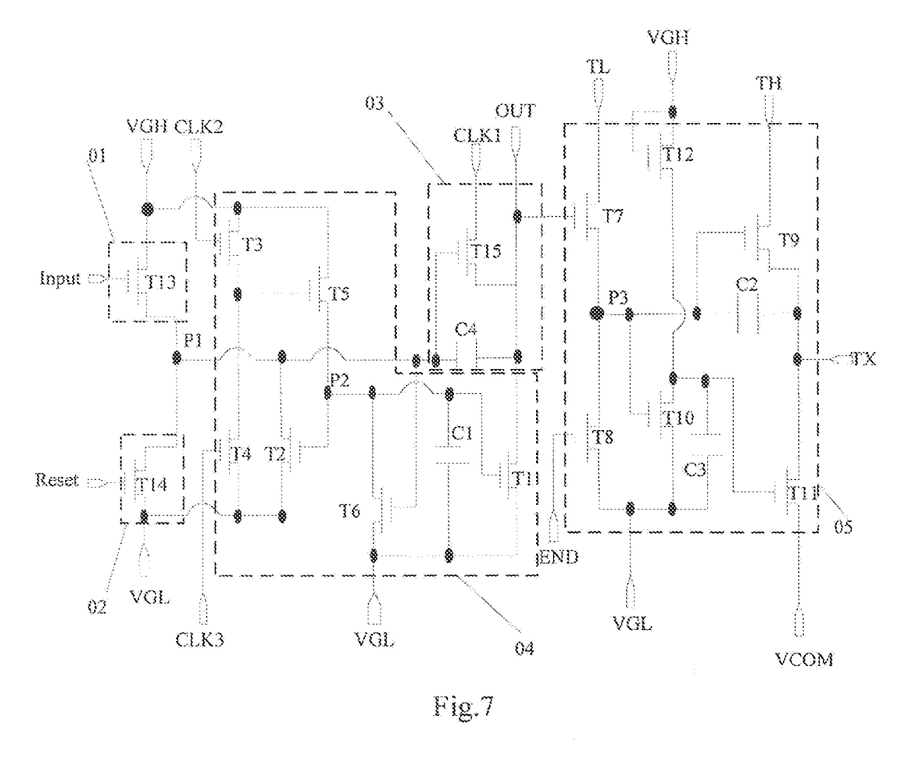
FIG. 7 is a schematic diagram of a detailed structure of a touch circuit provided by an embodiment of the present disclosure.

In the specific implementation, in the above touch circuit provided by the embodiment of the present disclosure, as illustrated in FIG. 7, the common voltage signal output control unit may further include a twelfth switching transistor T12.

A gate and a source of the twelfth switching transistor T12 are connected with the high-level signal terminal VGH, and a drain thereof is connected with the source of the tenth switching transistor T10 and the gate of the eleventh switching transistor T11.

Specifically, in the above touch circuit provided by the embodiment of the present disclosure, the twelfth switching transistor T12 connects the high-level signal terminal VGH with the source of the tenth switching transistor T10 and the gate of the eleventh switching transistor T11 in the diode connection manner and is always in a normally-on state. When the tenth switching transistor T10 is in a turned-off state, the high-level signal input to the high-level signal terminal VGH is transferred to the gate of the eleventh switching transistor T11, so that the eleventh switching transistor T11 is in a turned-on state. The turned-on eleventh switching transistor T11 connects the common voltage signal terminal VCOM with the touch signal output terminal TX, and then causes the touch signal output terminal TX to output the common voltage signal.

In the specific implementation, in the above touch circuit provided by the embodiment of the present disclosure, as illustrated in FIG. 7, the input module 01 may specifically include a thirteenth switching transistor T13.

A gate of the thirteenth switching transistor T13 is connected with the signal input terminal INPUT, a source thereof is connected with the high-level signal terminal VGH, and a drain thereof is connected with the first node P1.

Specifically, in the above touch circuit provided by the embodiment of the present disclosure, when the high-level signal is input to the signal input terminal INPUT, the thirteenth switching transistor T13 is in a turned-on state. The turned-on thirteenth switching transistor T13 connects the high-level signal terminal VGH with the first node P1, pulling up the potential of the first node P1.

In the specific implementation, in the above touch circuit provided by the embodiment of the present disclosure, as illustrated in FIG. 7, the reset module 02 may specifically include a fourteenth switching transistor T14.

A gate of the fourteenth switching transistor 114 is connected with the reset signal terminal RESET, a source thereof is connected with the first node P1, and a drain thereof is connected with the low-level signal terminal VGL.

Specifically, in the above touch circuit provided by the embodiment of the present disclosure, when the high-level signal is input to the reset signal terminal RESET, the fourteenth switching transistor T14 is in a turned-on state. The turned-on fourteenth switching transistor T14 connects the low-level signal terminal VGL with the first node P1, pulling down the potential of the first node P1.

In the specific implementation, in the above touch circuit provided by the embodiment of the present disclosure, as illustrated in FIG. 7, the pull-up module 03 may specifically include a fifteenth switching transistor T15 and a fourth capacitor C4.

A gate of the fifteenth switching transistor T15 is connected with the first node P1, a source thereof is connected with the first clock signal terminal CLK1, and a drain thereof is connected with the control signal output terminal OUT.

The fourth capacitor C4 is connected between the first node P1 and the control signal output terminal OUT.

Specifically, in the above touch circuit provided by the embodiment of the present disclosure, when the potential of the first node P1 is pulled up, the fifteenth switching transistor T15 is in a turned-on state. The turned-on fifteenth switching transistor T15 connects the first clock signal terminal CLK1 with the control signal output terminal OUT, and thus the signal at the first clock signal terminal CLK1 is transferred to the control signal output terminal OUT.

Based on the same inventive concept, an embodiment of the present disclosure provides a touch panel including multiple cascaded touch circuits provided by the embodiment of the present disclosure above. The control signal output terminal of each of touch circuits other than the first-stage touch circuit and the last-stage touch circuit is connected with the signal input terminal of the next-stage touch circuit adjacent thereto and with the reset signal terminal of the previous-stage touch circuit adjacent thereto. The control signal output terminal of the first-stage touch circuit is connected with the signal input terminal of the second-stage touch circuit, and the control signal output terminal of the last-stage touch circuit is connected with the reset signal terminal of the previous-stage touch circuit.

It is noted that the switching transistor mentioned in the above embodiments of the present disclosure may be N-type Thin Film Transistors (TFTs). In the specific implementation, sources and drains of these transistors may be interchanged with each other and are not differentiated specifically from each other. In fact, since the source and drain of the transistor used herein are symmetric to each other, the source and the drain may be interchanged with each other. In the embodiments of the present disclosure, in order to distinguish two electrodes other than the gate of the transistor, the one electrode thereof is called as a source and the other electrode is called as a drain. If the source is selected as the signal input terminal, the drain functions as the signal output terminal, and vice versa. Respective modules in the touch circuit provided by the embodiments of the present disclosure may all be formed by N-type thin film transistors, that is, fifteen NMOS transistors and four capacitors in total are needed to form the touch circuit, and better matches with the drive circuit formed by the N-type thin film transistors which is used for driving the display panel to implement the display function. As compared with the known touch circuit in which more thin film transistors are used to build the circuits of transmission gates, inverters and tri-state gates, the touch circuit provided by the embodiment of the present disclosure employs less N-type thin film transistors, and thus has a simpler structure and the lower power consumption.

Furthermore, in the cascaded touch circuits of the touch panel provided by the embodiment of the present disclosure, the touch circuit at each stage has three clock signal terminals. Beginning from the first-stage touch circuit, every four adjacent cascaded touch circuits are grouped into one group. Clock signals input to the first clock signal terminals CLK1 of the first touch circuit to the fourth touch circuit in each group are clock signals CK1, CK2, CK3, CK4 successively. Clock signals input to the second clock signal terminals CLK2 of the first touch circuit to the fourth touch circuit in each group are clock signals CK2, CK3, CK4, CK1 successively. Clock signals input to the third clock signal terminals CLK3 of the first touch circuit to the fourth touch circuit in each group are clock signals CK4, CK1, CK2, CK3 successively.

In addition, in the above touch circuit provided by the embodiment of the present disclosure, the pulse width of the low-frequency signal input to the low-frequency signal terminal TL is at least twice as much as that of the high-frequency signal input to the high-frequency signal terminal TH. When the high-frequency signal is output at the touch signal output terminal TX, within the pulse width of the low-frequency signal input to the low-frequency signal terminal TL, the high-frequency signal output at the touch signal output terminal TX is performed the sample selection, which decides how many high-frequency signals are output each time when the touch signal output terminal TX outputs the high-frequency signal. For example, if the pulse width of the low-frequency signal is twice as much as that of the high-frequency signal, two high-frequency signals are output each time when the touch signal output terminal TX outputs the high-frequency signal.

Figure 8:
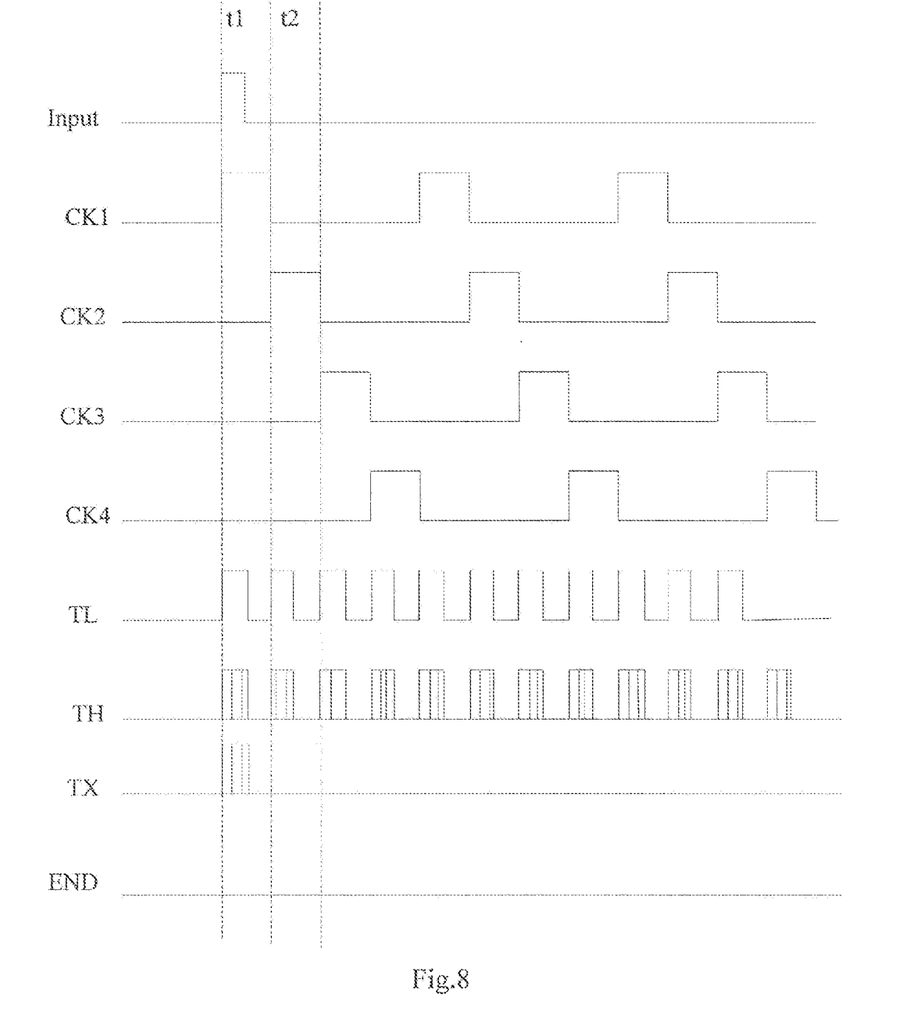
FIG. 8 is a schematic diagram of an operational timing sequence of a touch circuit provided by an embodiment of the present disclosure.

In the following, the operational procedure of the touch circuit provided by the embodiment of the present disclosure is described in detail in conjunction with the touch circuit provided by the embodiment of the present disclosure and the operational timing sequence. The operational procedure of the touch circuit provided by the embodiment of the present disclosure is described by taking the touch circuit as illustrated in FIG. 7 and the timing sequence diagram for input and output as illustrated in FIG. 8 as an example. Specifically, two phases t1~t2 in the time sequence diagram for input and output as illustrated in FIG. 8 is selected. In the description below, the high-level signal is indicated by 1 and the low-level signal is indicated by 0.

During the phase t1, INPUT=1, TL=1, TH=1, CK1=1, CK2=0, CK3=0, CK4=0, RESET=0, END=0. Since INPUT=1, the thirteenth switching transistor T13 is turned on. The turned-on thirteenth switching transistor T13 connects the high-level signal terminal VGH with the first node P1, thus the potential of the first node P1 is pulled up to a high level. Consequently, the sixth switching transistor T6 and the fifteenth switching transistor T15 are turned on. The turned-on sixth switching transistor T6 connects the low-level signal terminal VGL with the second node P2, thus the potential of the second node P2 is pulled down and the first switching transistor T1 and the second switching transistor T2 are turned off. The turned-on fifteenth switching transistor T15 connects the first clock signal terminal CLK1 with the control signal output terminal OUT. Since CK1=1, the potential of the control signal output terminal OUT is pulled up. Thereby, the seventh switching transistor T7 is in a turned-on state, and the turned-on seventh switching transistor T7 connects the low-frequency signal terminal TL with the third node P3. Since TL=1, the potential of the third node P3 is pulled up. Thereby, the ninth switching transistor T9 and the tenth switching transistor T10 are in a turned-on state. The turned-on tenth switching transistor T10 connects the low-level signal terminal VGL with the gate of the eleventh switching transistor T11 and the drain of the twelfth switching transistor T12, thus the eleventh switching transistor T11 is turned off. Meanwhile, the turned-on ninth switching transistor T9 connects the high-frequency signal terminal TH with the touch signal output terminal TX, so that the touch signal output terminal TX outputs the high-frequency signal based on the pulse width of the low-frequency signal input to the low-frequency signal terminal TL. The phase t1 is a phase in which the touch signal output terminal TX outputs the high-frequency signal.

During the phase t2, INPUT=0, TL=1, TH=1, CK1=0, CK2=1, CK3=0, CK4=0, RESET=1, END=0. Since RESET=1, the fourteenth switching transistor T14 is turned on. The turned-on fourteenth switching transistor T14 connects the low-level signal terminal VGL with the first node P1, thus the potential of the first node P1 is pulled down to a low level. Since CK2=1, the third switching transistor T3 is turned on. The turned-on third switching transistor T3 connects the high-level signal terminal VGH with the gate of the fifth switching transistor T5, thus the fifth switching transistor T5 is turned on. The turned-on fifth switching transistor T5 connects the high-level signal terminal VGH with the second node P2, thus the potential of the second node P2 is pulled up to a high level. Thus, the first switching transistor T1 and the second switching transistor T2 are turned on. The turned-on first switching transistor T1 connects the control signal output terminal OUT with the low-level signal terminal VGL, thus the potential of the control signal output terminal OUT is pulled down to a low level. Thus, the seventh switching transistor T7 is turned off, so that the ninth switching transistor T9 and the tenth switching transistor T10 are turned off. The turned-on twelfth switching transistor T12 connects the low-level signal terminal VGL with the first node P1, thus the potential of the first node P1 is further pulled down. Since the twelfth switching transistor T12 is in a normally-on state and the tenth switching transistor T10 is in a turned-off state at this time, the gate of the eleventh switching transistor T11 is connected with the high-level signal terminal VGH via the twelfth switching transistor T12. Thus, the eleventh switching transistor T11 is turned on. The turned-on eleventh switching transistor T11 connects the common voltage signal terminal VCOM with the touch signal output terminal TX, so that the touch signal output terminal TX outputs the common voltage signal. The phase t2 is a phase in which the touch signal output terminal TX outputs the common voltage signal.

During the subsequent time period, the touch signal output terminal outputs the common voltage signal until the signal input terminal INPUT inputs a high level again at a certain time.

Figure 9:
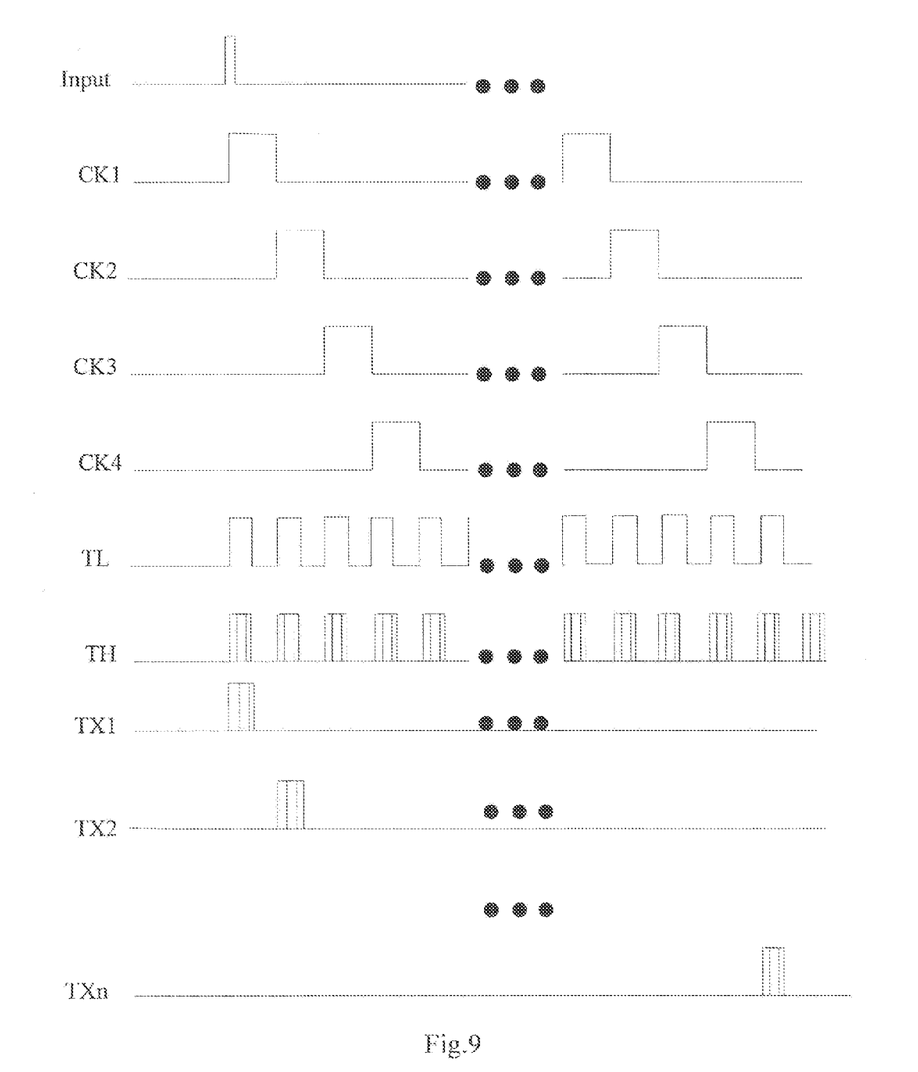
FIG. 9 is a schematic diagram of an operational timing sequence by which cascaded touch circuits provided by an embodiment of the present disclosure output touch signals in sequence.

The above procedure is the operational procedure in which one touch circuit outputs the high-frequency signal and the common voltage signal respectively. In the entire cascaded touch circuits of the touch panel, under the control of respective signal control terminals, the touch circuit at each stage outputs the high-frequency signal and the common voltage signal respectively according to the above operational procedure, as illustrated in FIG. 9. Finally, the function of the touch circuits outputting high-frequency signals stage by stage is realized, that is, the procedure that the touch panel performs the touch scan line by line is achieved.

Based on the same inventive concept, an embodiment of the present disclosure provides a display apparatus including the above touch panel provided by the embodiment of the present disclosure. The display apparatus may be applied to any product or component having a display function, such as a mobile phone, a tablet computer, a television set, a display, a notebook computer, a digital photo frame, a navigator and the like. Since the principle for solving problems by the display apparatus is the same as that by the touch circuit, the implementation of the display apparatus may refer to the implementation of the above touch circuit, and the repetition is no longer be discussed so as to avoid redundancy.

Embodiments of the present disclosure provide a touch circuit, a touch panel and a display apparatus. The touch circuit includes an input module, a reset module, a pull-up module, a pull-down module and a touch signal output control module. The input module is used for pulling up the potential of the first node under the control of the signal input terminal. The reset module is used for pulling down the potential of the first node under the control of the reset signal terminal. The pull-up module is used for pulling up the potential of the control signal output terminal under the control of the first node and the first clock signal terminal. The pull-down module is used for pulling down potentials of the first node and the control signal output terminal under the control of the second clock signal terminal and the third clock signal terminal. The touch signal output control module is used for controlling the touch signal output terminal to choose to output a high-frequency signal or a common voltage signal under the control of the control signal output terminal. In this way, the function of outputting a touch signal by a touch circuit is implemented. As compared with the known touch circuit in which more thin film transistors are used to build circuits of transmission gates, inverters and tri-state gates, the touch circuit provided by the embodiment of the present disclosure has a simpler structure and the lower power consumption.

Obviously, those skilled in the art may make a variety of changes and variations to the present disclosure without departing from the spirit and scope of the present disclosure. In this way, if such changes and variations to the present disclosure belong to the scope of claims of the present disclosure and the equivalent techniques thereof, the present disclosure is intended to cover such changes and variations too.

The present application claims the priority of a Chinese patent application No. 201510030501.9 submitted on Jan. 21, 2015, the entire content disclosed by which is referenced hereby as a part of the present application.

What is claimed is:

1. A touch circuit, comprising an input sub-circuit, a reset sub-circuit, a pull-up sub-circuit, a pull-down sub-circuit and a touch signal output control sub-circuit, wherein:
   a control terminal of the input sub-circuit is connected with a signal input terminal, an input terminal thereof is connected with a high-level signal terminal, and an output terminal thereof is connected with a first node, the input sub-circuit configured to pull up a potential of the first node under a control of the signal input terminal;
   a control terminal of the reset sub-circuit is connected with a reset signal terminal, an input terminal thereof is connected with the first node, and an output terminal thereof is connected with a low-level signal terminal, the reset sub-circuit configured to pull down the potential of the first node under a control of the reset signal terminal;
   a control terminal of the pull-up sub-circuit is connected with the first node, an input terminal thereof is connected with a first clock signal terminal, and an output terminal thereof is connected with a control signal output terminal, the pull-up sub-circuit configured to pull up a potential of the control signal output terminal under controls of the first node and the first clock signal terminal;
   the pull-down sub-circuit is connected among the high-level signal terminal, the low-level signal terminal, a second clock signal terminal, a third clock signal terminal, the control signal output terminal and the first node, the pull-down sub-circuit configured to pull down potentials of the first node and the control signal output terminal under controls of the second clock signal terminal and the third clock signal terminal;
   the touch signal output control sub-circuit is connected among the high-level signal terminal, the low-level signal terminal, the control signal output terminal, a low-frequency signal terminal, a high-frequency signal terminal, a common voltage signal terminal, an cut-off signal terminal and a touch signal output terminal, the touch signal output control sub-circuit configured to control the touch signal output terminal to choose to output a high-frequency signal or a common voltage signal under a control of the control signal output terminal.

2. The touch circuit according to claim 1, wherein the pull-down sub-circuit comprises a first pull-down unit, a second pull-down unit, a first pull-down control unit and a second pull-down control unit;
   the first pull-down control unit is connected among the second clock signal terminal, the third clock signal terminal, the high-level signal terminal, the low-level signal terminal, the first node and a second node, the first pull-down control unit configured to pull up a potential of the second node under the controls of the second clock signal terminal and the third clock signal terminal;
   a control terminal of the second pull-down control unit is connected with the first node, an input terminal thereof is connected with the second node, and an output thereof is connected with the low-level signal terminal, the second pull-down control unit configured to pull down the potential of the second node when the potential of the first node is being pulled up;
   a control terminal of the first pull-down unit is connected with the second node, an input terminal thereof is connected with the control signal output terminal, and an output thereof is connected with the low-level signal terminal, the first pull-down unit configured to pull down the potential of the control signal output terminal when the potential of the second node is being pulled up; and
   a control terminal of the second pull-down unit is connected with the second node, an input terminal thereof is connected with the first node, and an output thereof is connected with the low-level signal terminal, the second pull-down unit configured to pull down the potential of the first node when the potential of the second node is being pulled up.

3. The touch circuit according to claim 2, wherein the first pull-down unit comprises a first switching transistor and a first capacitor;
   a gate of the first switching transistor is connected with the second node, a source thereof is connected with the control signal output terminal, and a drain thereof is connected with the low-level signal terminal;
   the first capacitor is connected between the second node and the low-level signal terminal.

4. The touch circuit according to claim 2, wherein the second pull-down unit comprises a second switching transistor;
 a gate of the second switching transistor is connected with the second node, a source thereof is connected with the first node, and a drain thereof is connected with the low-level signal terminal.

5. The touch circuit according to claim 2, wherein the first pull-down control unit comprises a third switching transistor, a fourth switching transistor and a fifth switching transistor;
 a gate of the third switching transistor is connected with the second clock signal terminal, a source thereof is connected with the high-level signal terminal, and a drain thereof is connected with a source of the fourth switching transistor and a gate of the fifth switching transistor;
 a gate of the fourth switching transistor is connected with the third clock signal terminal, and a drain thereof is connected with the low-level signal terminal;
 a source of the fifth switching transistor is connected with the high-level signal terminal, and a drain thereof is connected with the second node.

6. The touch circuit according to claim 2, wherein the second pull-down control unit comprises a sixth switching transistor;
 a gate of the sixth switching transistor is connected with the first node, a source thereof is connected with the second node, and a drain thereof is connected with the low-level signal terminal.

7. The touch circuit according to claim 1, wherein the touch signal output control sub-circuit comprises a high-frequency signal output control unit, a common voltage signal output control unit, a third node pull-up unit and a third node pull-down unit;
 a control terminal of the third node pull-up unit is connected with the control signal output terminal, an input terminal thereof is connected with the low-frequency signal terminal, and an output thereof is connected with the third node, the third node pull-up unit configured to pull up a potential of the third node when the potential of the control signal output terminal is being pulled up;
 a control terminal of the third node pull-down unit is connected with the cut-off signal terminal, an input terminal thereof is connected with the third node, and an output thereof is connected with the low-level signal terminal, the third node pull-down unit configured to pull down the potential of the third node under the control of the cut-off signal terminal;
 a control terminal of the high-frequency signal output control unit is connected with the third node, an input terminal thereof is connected with the high-frequency signal terminal, and an output thereof is connected with the touch signal output terminal, the high-frequency signal output control unit configured to control the touch signal output terminal to output the high-frequency signal when the potential of the third node is being pulled up;
 the common voltage signal output control unit is connected among the third node, the low-level signal terminal, the high-level signal terminal, the common voltage signal terminal and the touch signal output terminal, the common voltage signal output control unit configured to control the touch signal output terminal to output the common voltage signal when the potential of the third node is being pulled down.

8. The touch circuit according to claim 7, wherein the third node pull-up unit comprises a seventh switching transistor;
 a gate of the seventh switching transistor is connected with the control signal output terminal, a source thereof is connected with the low-frequency signal terminal, and a drain thereof is connected with the third node.

9. The touch circuit according to claim 7, wherein the third node pull-down unit comprises an eighth switching transistor;
 a gate of the eighth switching transistor is connected with the cut-off signal terminal, a source thereof is connected with the third node, and a drain thereof is connected with the low-level signal terminal.

10. The touch circuit according to claim 7, wherein the high-frequency signal output control unit comprises a ninth switching transistor and a second capacitor;
 a gate of the ninth switching transistor is connected with the third node, a source thereof is connected with the high-frequency signal terminal, and a drain thereof is connected with the touch signal output terminal;
 the second capacitor is connected between the third node and the touch signal output terminal.

11. The touch circuit according to claim 7, wherein the common voltage signal output control unit comprises a tenth switching transistor, an eleventh switching transistor and a third capacitor;
 a gate of the tenth switching transistor is connected with the third node, a source thereof is connected with the high-level signal terminal and the gate of the eleventh switching transistor respectively, and a drain thereof is connected with the low-level signal terminal;
 a source of the eleventh switching transistor is connected with the common voltage signal terminal, and a drain thereof is connected with the touch signal output terminal;
 the third capacitor is connected between the high-level signal terminal and the low-level signal terminal.

12. The touch circuit according to claim 11, wherein the common voltage signal output control unit comprises a twelfth switching transistor;
 a gate and a source of the twelfth switching transistor are connected with the high-level signal terminal, and a drain thereof is connected with the source of the tenth switching transistor and the gate of the eleventh switching transistor.

13. The touch circuit according to claim 1, wherein the input sub-circuit comprises a thirteenth switching transistor;
 a gate of the thirteenth switching transistor is connected with the signal input terminal, a source thereof is connected with the high-level signal terminal, and a drain thereof is connected with the first node.

14. The touch circuit according to claim 1, wherein the reset sub-circuit comprises a fourteenth switching transistor;
 a gate of the fourteenth switching transistor is connected with the reset signal terminal, a source thereof is connected with the first node, and a drain thereof is connected with the low-level signal terminal.

15. The touch circuit according to claim 1, wherein the pull-up sub-circuit comprises a fifteenth switching transistor and a fourth capacitor;
 a gate of the fifteenth switching transistor is connected with the first node, a source thereof is connected with the first clock signal terminal, and a drain thereof is connected with the control signal output terminal;
 the fourth capacitor is connected between the first node and the control signal output terminal.

16. A touch panel comprising a plurality of cascaded touch circuits according to claim 1, the control signal output terminal of each stage of touch circuits other than a first-stage touch circuit and a last-stage touch circuit being connected with the signal input terminal of a next-stage touch circuit adjacent thereto and with the reset signal terminal of a previous-stage touch circuit adjacent thereto, the control signal output terminal of the first-stage touch circuit being connected with the signal input terminal of a second-stage touch circuit, and the control signal output terminal of the last-stage touch circuit being connected with the reset signal terminal of a previous-stage touch circuit.

17. A display apparatus comprising the touch panel according to claim 16.

18. The touch panel according to claim 16, wherein the pull-down sub-circuit comprises a first pull-down unit, a second pull-down unit, a first pull-down control unit and a second pull-down control unit;

the first pull-down control unit is connected among the second clock signal terminal, the third dock signal terminal, the high-level signal terminal, the low-level signal terminal, the first node and a second node, the first pull-down control unit configured to pull up a potential of the second node under the controls of the second dock signal terminal and the third clock signal terminal;

a control terminal of the second pull-down control unit is connected with the first node, an input terminal thereof is connected with the second node, and an output thereof is connected with the low-level signal terminal, the second pull-down control unit configured to pull down the potential of the second node when the potential of the first node is being pulled up;

a control terminal of the first pull-down unit is connected with the second node, an input terminal thereof is connected with the control signal output terminal, and an output thereof is connected with the low-level signal terminal, the first pull-down unit configured to pull down the potential of the control signal output terminal when the potential of the second node is being pulled up; and a control terminal of the second pull-down unit is connected with the second node, an input terminal thereof is connected with the first node, and an output thereof is connected with the low-level signal terminal, the second pull-down unit configured to pull down the potential of the first node when the potential of the second node is being pulled up.

19. The touch panel according to claim 18, wherein the first pull-down unit comprises a first switching transistor and a first capacitor;

a gate of the first switching transistor is connected with the second node, a source thereof is connected with the control signal output terminal, and a drain thereof is connected with the low-level signal terminal;

the first capacitor is connected between the second node and the low-level signal terminal.

20. The touch panel according to claim 18, wherein the second pull-down unit comprises a second switching transistor;

a gate of the second switching transistor is connected with the second node, a source thereof is connected with the first node, and a drain thereof is connected with the low-level signal terminal.

* * * * *